United States Patent
Niebling et al.

(10) Patent No.: US 7,458,727 B2
(45) Date of Patent: Dec. 2, 2008

(54) SEAL ARRANGEMENT WITH ENCODER AND MAGNETIZATION HEAD FOR THE ENCODER

(75) Inventors: Peter Niebling, Bad Kissingen (DE); Jens Heim, Schweinfurt (DE); Heinrich Hofmann, Schweinfurt (DE); Darius Dlugai, Schweinfurt (DE); Roland Langer, Schwanfeld (DE)

(73) Assignee: Schaeffler KG (DE)

( * ) Notice: Subject to any disclaimer, the term of this patent is extended or adjusted under 35 U.S.C. 154(b) by 196 days.

(21) Appl. No.: 11/443,139

(22) Filed: May 25, 2006

(65) Prior Publication Data
US 2006/0215947 A1 Sep. 28, 2006

Related U.S. Application Data

(62) Division of application No. 10/803,412, filed on Mar. 18, 2004, now Pat. No. 7,077,574.

(30) Foreign Application Priority Data
Aug. 25, 2003 (DE) .................. 103 38 960

(51) Int. Cl.
*F16C 32/00* (2006.01)
*F16C 41/00* (2006.01)
*G01P 3/48* (2006.01)
*F16J 15/00* (2006.01)

(52) U.S. Cl. .................. 384/448; 384/484; 324/174; 277/317; 277/402

(58) Field of Classification Search ......... 384/446–448, 384/477, 485–486; 324/173–174; 310/168; 277/317, 353, 402, 571; 340/870.31, 870.16, 340/870.3
See application file for complete search history.

(56) References Cited

U.S. PATENT DOCUMENTS

| | | | | |
|---|---|---|---|---|
| 4,948,277 A | * | 8/1990 | Alff | 384/448 |
| 5,431,413 A | * | 7/1995 | Hajzler | 384/448 |
| 5,575,568 A | * | 11/1996 | Rigaux et al. | 384/448 |
| 5,642,042 A | | 6/1997 | Goossens et al. | |
| 5,695,289 A | * | 12/1997 | Ouchi et al. | 384/448 |
| 5,764,049 A | | 6/1998 | Hofmann et al. | |
| 5,898,388 A | * | 4/1999 | Hofmann et al. | 340/870.31 |

(Continued)

FOREIGN PATENT DOCUMENTS
EP 0 595 728 B1 4/1998

(Continued)

*Primary Examiner*—Marcus Charles
(74) *Attorney, Agent, or Firm*—Ostrolenk, Faber, Gerb & Soffen, LLP

(57) ABSTRACT

The invention relates to a seal arrangement for sealing off at least one radial interspace between at least one bearing ring which can rotate and at least one rotationally fixed bearing ring. The seal arrangement is provided with at least a first carrier, the first carrier carrying at least one resilient seal and being fixed to a rotationally fixed bearing ring, and a second carrier, the second carrier being fixed to the bearing ring that can rotate and carrying at least one encoder. The encoder has an outwardly oriented circumferential surface in the shape of a truncated circular cone.

18 Claims, 5 Drawing Sheets

U.S. PATENT DOCUMENTS

| | | | | |
|---|---|---|---|---|
| 5,969,518 | A * | 10/1999 | Merklein et al. | 324/173 |
| 6,329,814 | B1 | 12/2001 | Ichiman et al. | |
| 6,573,705 | B1 * | 6/2003 | Tajima et al. | 324/174 |
| 2002/0126926 | A1 * | 9/2002 | Ohtsuki et al. | 384/448 |
| 2003/0138175 | A1 * | 7/2003 | Vignotto et al. | 384/448 |
| 2004/0105603 | A1 * | 6/2004 | Ohtsuki et al. | 384/448 |

FOREIGN PATENT DOCUMENTS

| | | |
|---|---|---|
| EP | 1 160 492 A2 | 12/2001 |
| EP | 1 164 318 A2 | 12/2001 |
| JP | 10009402 A * | 1/1998 |

* cited by examiner

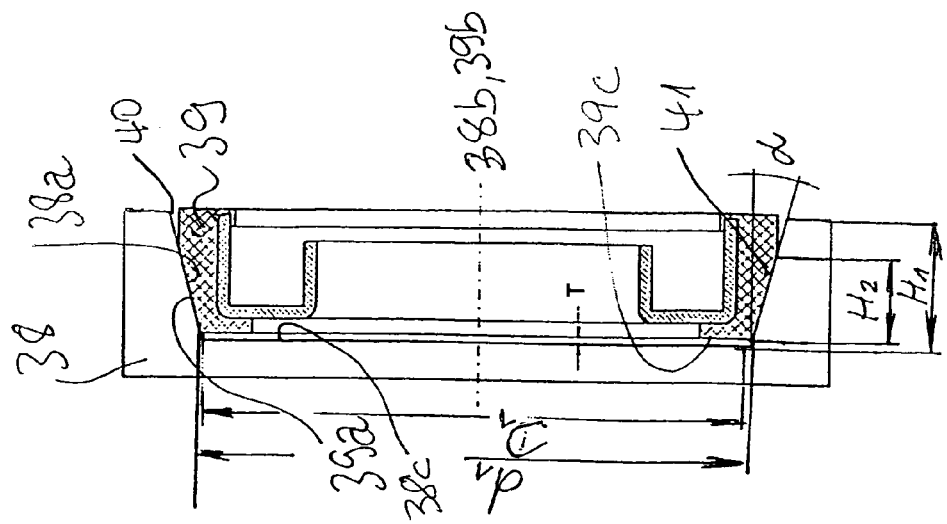
Fig. 7
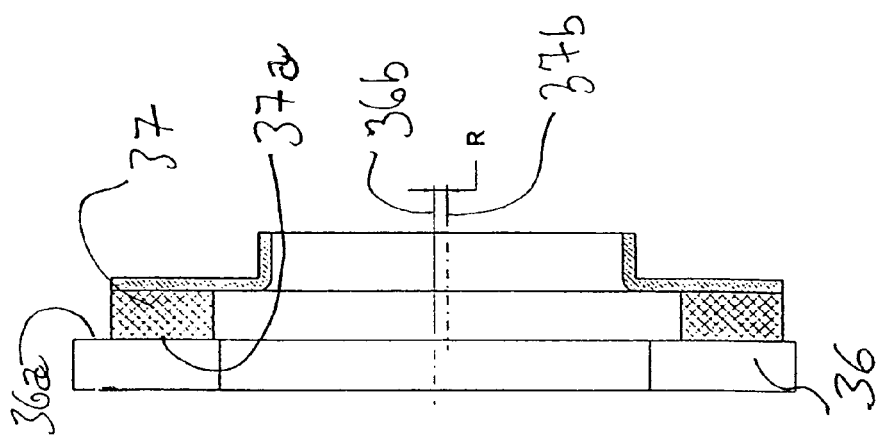
Fig. 6 (Stand der Technik)
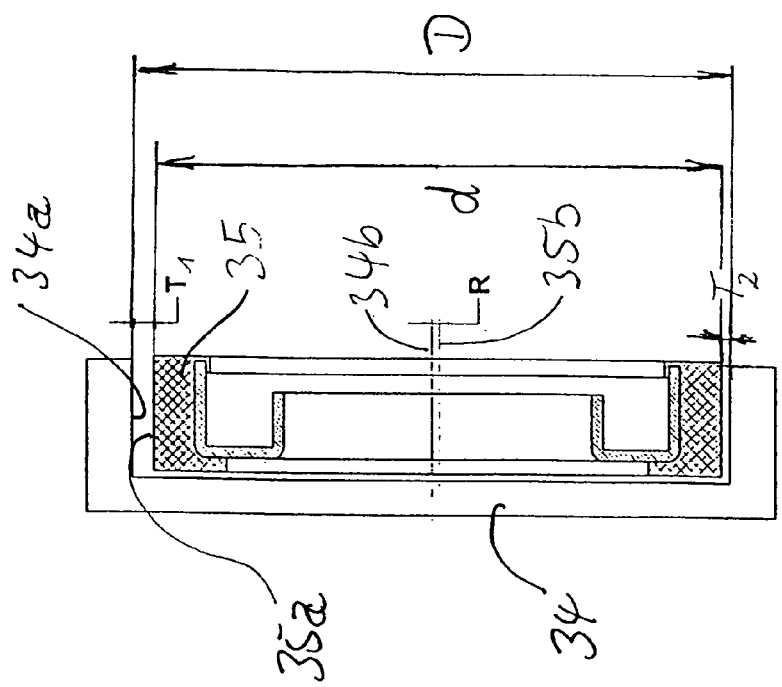
Fig. 5 (Stand der Technik)

SEAL ARRANGEMENT WITH ENCODER AND MAGNETIZATION HEAD FOR THE ENCODER

CROSS REFERENCE TO A RELATED APPLICATION

The present application is a Divisional Application of Ser. No. 10/803,412 filed Mar. 18, 2004, which application claims the benefit and priority of German Application Serial No 103 38 960.1, filed Aug. 25, 2003, incorporated by reference.

BACKGROUND OF THE INVENTION

1. Field of the Invention

The invention relates to a seal arrangement for sealing off at least one radial interspace between at least one inner bearing ring and at least one outer bearing ring. It relates more particularly to a seal arrangement provided with at least one first carrier, the first carrier carrying at least one resilient seal, and a second carrier, the second carrier carrying at least one encoder, and the encoder having an outwardly oriented circumferential surface shaped as a truncated circular cone.

An encoder on a seal of a known type is described in U.S. Pat. No. 6,329,814 B1. U.S. Pat. No. 6,329,814 B1 discusses a problem of limited available space for the installation of a seal arrangement with an encoder on the bearing. The problem is circumvented in that example by an enlarged magnetized active surface and, optionally, by arranging the encoder radially on the outside of the outer ring.

However, this solution is still only partly effective because of the limited radial space between the inner bearing ring and the outer bearing ring. Further, an encoder cannot be arranged radially on the outside of the outer bearing ring in every case, since, because of the connecting structures, no space or too little space is frequently available for such an arrangement. In addition, an encoder arranged radially on the outer bearing ring can be integrated only with difficulty into a seal constructed as one structural unit. A seal of this type becomes very complicated, is difficult to install, and does not provide sufficient protection for the encoder against environmental influences.

U.S. Pat. No. 6,329,814 B1 also describes some advantages provided by the polarization of an encoder with a circumferential surface in the shape of a truncated circular cone, as compared with the polarization of circularly cylindrical and outwardly oriented active outer surfaces.

SUMMARY OF THE INVENTION

A first aspect of the invention provides a seal arrangement with an encoder whose encoder is provided with an outer circumferential surface shaped as a truncated circular cone, in which the advantages of this encoder are utilized, which is of space-saving design and which can be produced and installed simply and cost-effectively. Furthermore, a magnetization head for an encoder is provided, with which such an encoder can be polarized in an improved manner.

The invention is directed generally to a seal arrangement which seals off at least one radial interspace between at least one bearing ring which can rotate and at least one rotationally fixed bearing ring. The seal arrangement is provided with a least one first carrier, the first carrier carrying at least one resilient seal and being fixed to a rotationally fixed bearing ring; a second carrier, the second carrier being fixed to the bearing ring that can rotate and carrying at least one encoder, and the encoder having an outwardly oriented circumferential surface of a truncated circular cone; and a dirt deflector, the dirt deflector and the first carrier being arranged such that they can rotate relative to each other, wherein the seal bears at least on the dirt deflector; and the encoder being arranged outside the interspace and engaging around the bearing ring that can rotate.

There may also be a covering element, the encoder being covered radially and axially by the covering element, the covering element being fixed to one of the bearing rings. The covering element at least partly covers the seal. The covering element is preferably non-ferromagnetic material and may be formed in one piece with the first carrier.

More specifically, the covering element may be fixed to a radially outer surface section of the rotationally fixed bearing ring.

The dirt deflector and the second carrier may be formed from sheet metal in one piece. The seal may bear on the dirt deflector in the radial or axial direction with at least one sealing lip. The seal may bear directly on the bearing ring that can rotate, or radially on the second carrier. The seal and the dirt deflector may enclose between them an annular hollow space filled with a lubricating grease.

The dirt deflector may be a sheet metal ring with an angled cross section having two limbs aligned at right angles to each other, the encoder engaging radially around at least one of the limbs. The second carrier may be a sheet metal ring with two hollow cylindrical sections that point away from each other, the sections being connected to each other by a web which is disk-like and goes radially away from the bearing ring that can rotate and, in the process, one of the sections accommodates the encoder radially and the other of the sections is seated on the bearing ring that can rotate.

The encoder is advantageously formed from a resilient material.

A magnetization head has on its inner circumference an inner circumferential surface defining an inner cone, the inner circumferential surface corresponding with the circumferential surface of the truncated cone of the encoder. The rectilinear inner circumferential lines of the inner circumferential surface describing the inner cone and inclined with respect to the axis of rotation of the magnetization head are preferably longer than the circumferential lines oriented in the same direction as the inner circumferential lines and describing the circumferential surface of the encoder. Further, the smallest inner cone diameter of the inner cone is preferably smaller than the smallest external diameter of the truncated circular cone. Also preferably, the inner circumferential surface of the magnetization head that is seated on the encoder during polarization, bearing on the circumferential surface, projects axially beyond the circumferential surface of the encoder on both sides.

In this disclosure, the term encoder stands for one or more single-part or multi-part encoders which is/are arranged on the circumferential side of the bearing axis. The encoder is made from magnetizable material and is alternately polarized. Examples of such materials are plastics such as polyamides whose magnetizable material has bainitic ferrite or strontium ferrite added to it, or plastics which have magnetizable inserts. Alternatively, the encoder may be made of magnetizable metal.

At least one sensor, arranged on the outside, around the seal arrangement and encoder, may pick up signals from the encoder, irrespective of possibly otherwise oriented scattering of these signals, taking account of the angle of inclination of the cone, or may transmit signals in the direction of the encoder. The sensor or sensors may be seated on the fixed bearing ring, which cannot move in relation to the rotating bearing ring, or may be fixed to the vehicle in another way.

The encoder is provided with a surface which faces in the direction of the sensor, and is alternatively signal-accepting, signal-reflecting or signal-generating and thus active. The active surface points radially outward and forms an (outer) circumferential surface which defines a truncated circular cone. The radially outwardly oriented active surface of the encoder is preferably formed on a one-part encoder in the form of a rotationally symmetrical hollow truncated cone or assembled in a number of parts from a plurality of segments defining such a truncated cone. The encoder is arranged on the rotating bearing ring via a carrier preferably shaped from sheet metal.

The substantial advantages of an encoder with the circumferential surface in the shape of a truncated circular cone are a uniform magnetic field strength on the entire periphery and high accuracy of the pitch of the polarization of the magnetized encoder, which are provided by the following factors:

The magnetization head for magnetizing by use of one (mating) inner cone matched to the truncated cone is centered on the truncated cone of the encoder. This avoids the inaccuracies which occur when magnetizing encoders with a cylindrically radially outwardly oriented or axially aligned annular active surface as a result of the axial offset of the mid-axis of the magnetization head in relation to the mid-axis of the encoder.

The magnetization head is seated directly on the encoder to be magnetized. Erroneous alignments, such as an axial offset between magnetization head and encoder, are avoided. The axial offset during magnetization occurs when a gap exists between a magnetization head and an encoder with a cylindrically radially outwardly oriented or axially aligned annular active surface.

When resilient materials are used as a material for the encoder, the encoder nestles with a resiliently compliant surface on the inside against the magnetization head when the magnetization head bears under pressure on the encoder during magnetization. Compliant materials of this type are, for example, NBR (acrylonitrile butadiene rubber).

A second aspect of the invention provides a magnetization head for magnetizing an encoder of a seal arrangement according to the first aspect of the invention which, on its inner circumference, has a polarizing inner circumferential surface defining an inner cone, which corresponds to the active circumferential surface of the truncated cone of the encoder. The rectilinear inner circumferential lines of the inner circumferential surface, describing the inner cone and inclined with respect to the axis of rotation of the magnetization head, are in this case at least as long as and preferably longer than the rectilinear circumferential lines of the active circumferential surface of the encoder, oriented in the same direction as the inner circumferential lines. The amount by which the inner circumferential lines are longer in this case takes account of the production tolerances, occurring in the mass production of encoders, of the axial width of the encoder (i.e., the maximum height of the truncated cone oriented in the same direction as the axis of rotation). Furthermore, the smallest inner cone diameter of the inner cone is smaller than the smallest outer diameter of the truncated circular cone. The inner circumferential surface of the magnetization head seated on the encoder bears on the circumferential surface of the encoder during polarization. The inner circumferential surface projects beyond the circumferential surface of the encoder axially on both sides. The inner cone of the magnetization head in any case engages over and accordingly magnetizes the entire active circumferential surface of each encoder, irrespective of width fluctuations among a series of encoders of identical type/identical design or in the case of encoders of the same nominal dimensions.

The cone angle of the magnetization head or encoder is preferably $5°<=\alpha<=15°$.

The interspace of the bearing is predefined by the geometry of the outer bearing ring and the shape of the inner bearing ring. Radially, the interspace is bounded by the inner circumferential surface of the narrower, normally outer, bearing ring and also by the outer circumferential surface of the broader, normally inner, bearing ring. The antifriction elements and the cages of the bearing are arranged in the interspace. The interspace ends axially at imaginary planes which are aligned perpendicular to the bearing axis and which originate from the end faces of the bearing ring (optionally the inner or outer ring) which is narrowest in terms of its axial width. The inner ring is as a rule broader than the outer ring and thus pierces at least one of these planes at the side of the bearing on which the encoder adjoins the interspace. The encoder optionally adjoins the outer ring or interspace axially and engages around the inner ring circumferentially.

The arrangement of the encoder outside the interspace offers the advantage that the encoder can be provided with a substantially larger active surface. The sensor unit with a radially outwardly oriented encoder takes up less radial height, as compared with axially aligned encoders. The gain in overall space can additionally be utilized for an optimum shape of the seal, since only a little radial space is available for the installation of a seal.

In wheel bearing units, the outer bearing rings frequently migrate axially outward as compared with their ideal position in relation to the inner bearing ring, by the order of magnitude of normal operational play. In seal arrangements in which the encoder is sensed in the axial direction by the sensor, the outward migration influences the gap space in between encoder and sensor, which is axial in this case. As the gap width increases, the transmission becomes more inaccurate. By contrast, the gap dimension, oriented in the same direction as the inclination of the truncated cone, between the encoder and the sensor of a seal arrangement according to the invention is not influenced by outward migration of the bearing ring. The possible axial offset between sensor and encoder produced by the outward migration of the outer bearing ring is merely taken into account from the start in the design of the overall width of the encoder. The sensor arrangement is thus less susceptible to faults.

The seal arrangement protected by a covering element is optimally protected with all constituent parts protected against external environmental influences. The covering element is designed in the form of a covering cap and, depending on further functions additional to the covering function, is preferably formed from non-ferromagnetic plastics or metals. The covering element and the sheet metal carrier are preferably shaped cold by cold forming, such as by bending, rolling, drawing, embossing or punching. The covering element assists the sealing function of the seal arrangement of the bearing.

The seal arrangement is adapted for installation in the wheel bearing sets of all conceivable motor vehicles. This relates in particular to two-row and four-row bearing sets but also all other conceivable wheel bearing sets with rollers or balls as antifriction elements, in particular in inclined roller or inclined ball bearing design. The wheel bearing sets optionally have single-piece bearing rings with running tracks for all of the rows, divided bearing rings or a bearing ring for each row and combinations of these aforementioned configurations. The inner bearing rings can rotate either in relation to the outer bearing ring(s) or the outer can rotate in relation to the inner. One of the bearing rings is preferably fixed to the vehicle in relation to the rotatable bearing rings. Inner bearing rings are preferably seated on a hub, the mounting being set against the hub without play by a flanged edge. The outer bearing ring is optionally formed in one piece with one or more flanges for fixing the wheel bearing unit on the vehicle side or wheel side, or these bearing rings may be introduced into a corresponding flanged housing.

The seal is formed of the materials normally used, such as elastomers, and alternatively also may have radially pre-stressing endless spiral springs.

The seal arrangement is preferably formed as a cartridge seal. The important elements of the seal arrangement are assembled to form an intrinsically self-contained structural unit comprising carriers, covering cap, seal and encoder (cartridge seal). Stock keeping, transport and installation in the bearing unit are therefore simplified. The seal arrangement can be interchanged with seal arrangements according to the prior art without changes necessitated by overall space having to be made in the design of the bearing unit.

Other features and advantages of the present invention will become apparent from the following description of embodiments of the invention which refers to the accompanying drawings.

BRIEF DESCRIPTION OF THE DRAWINGS

FIGS. 5 and 6 respectively show radially and axially oriented magnetization heads according to the prior art and their alignment in relation to corresponding encoders during polarization.

FIG. 7 shows, in schematic form, a magnetization head for an encoder in a seal arrangement according to an embodiment of the invention and its alignment in relation to the encoder.

DETAILED DESCRIPTION OF EMBODIMENTS OF THE INVENTION

Figure 1:
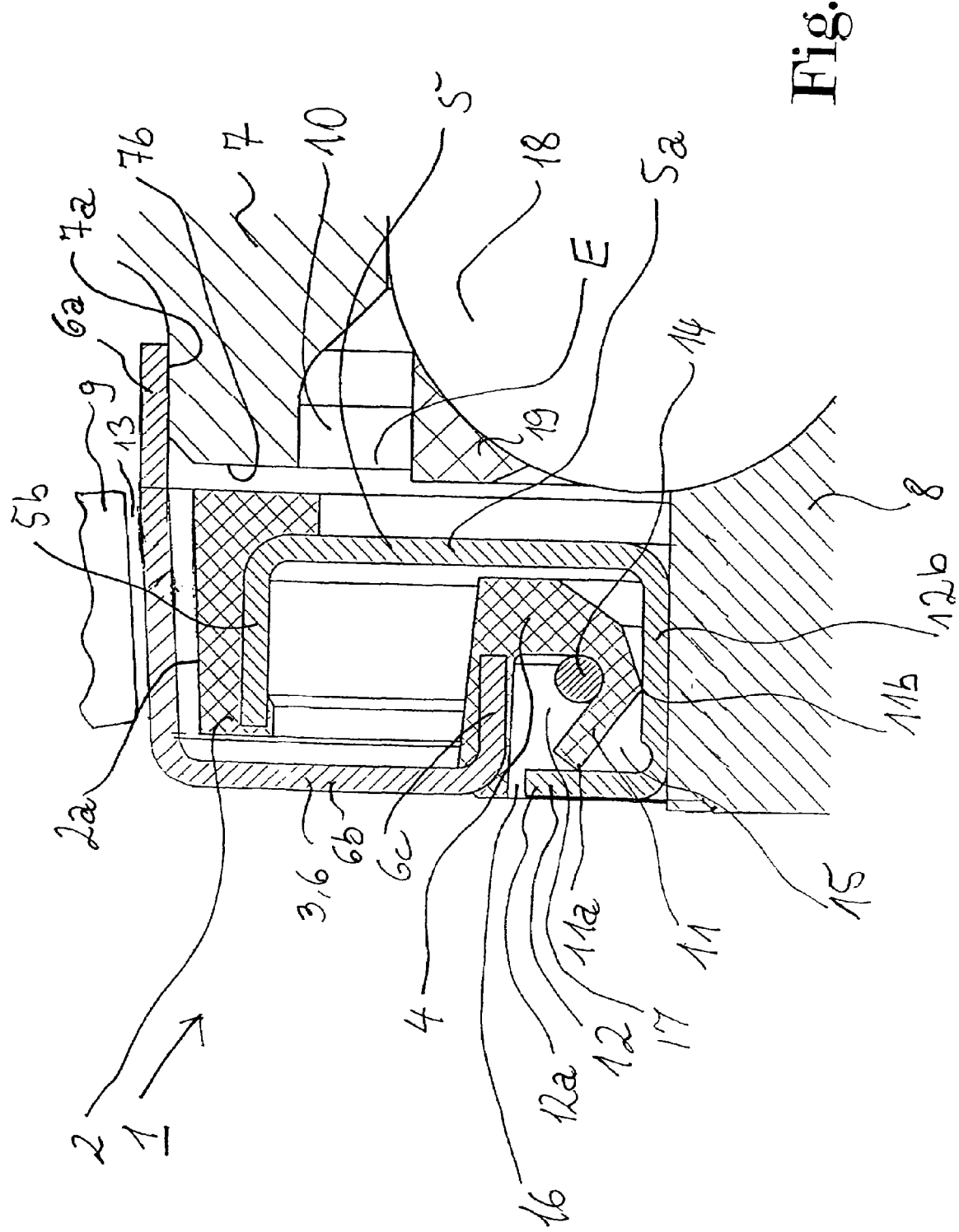
FIGS. 1 to 4 respectively show partial cross-sectional views of exemplary seal arrangements according to embodiments of the invention.

A seal arrangement 1 with an encoder 2 is illustrated in sectional representation in FIG. 1. The encoder 2 is integrated into the seal arrangement 1. The seal arrangement 1 has a first carrier 3, to which a seal 4 is fixed. Furthermore, the seal arrangement 1 has a second carrier 5 with the encoder 2. The encoder 2 is a hollow ring of plastic shaped like a hollow truncated cone with optionally magnetically polarized additions or inserts. On the circumferential side, the encoder 2 has an outwardly oriented circumferential surface 2a shaped as a truncated circular cone.

An outer bearing ring 7, which in this case is a rotationally fixed bearing ring, is assigned to a vehicle, not illustrated, such that it is fixed against rotation, and an inner bearing ring 8 can rotate relative to the outer bearing ring 7.

The seal arrangement 1 is assigned a sensor 9. The sensor 9 is seated radially outside the seal arrangement 2 and radially over the seal arrangement 2, either bearing on the seal arrangement (not shown) or separated from the latter by a gap 13.

The seal arrangement 1 is mostly covered by a covering element 6. The covering element 6 is formed from sheet metal in the manner of a cap in one piece with the first carrier 3 and on the outside is fixed to a surface section 7a of the outer bearing ring 7. For this purpose, the covering element 6 is seated with a hollow cylindrical section 6a pressed on the surface section 7a and from there extends axially away from the outer bearing ring 7, between the sensor 9 and the encoder 2. Then the covering element 6 extends radially inward in a disk-like section 6b. An interspace 10 is bounded on the side of the encoder 2 by the radial plane E, which runs through the front surface 7b of the outer bearing ring 7. The encoder 2 is covered radially and axially and the interspace 10 is covered axially with respect to the outside by the section 6b and thereby protected against contamination.

The covering element 6 finally extends into a hollow cylindrical section 6c which is angled away from the section 6b and runs axially in the direction of the antifriction elements 18. The seal 4 is fixed to the section 6c. The seal 4 has a sealing lip 11 with two sealing edges 11a and 11b. The sealing edge 11a bears in the axial direction on a dirt deflector 12.

The dirt deflector 12 is an angled ring whose one limb 12a is oriented radially outward away from the inner bearing ring 8. In addition, the dirt deflector 12 is formed from sheet metal in one piece with the second carrier 5 and, for this purpose, is connected to the carrier 5 via the other limb 12b. The second sealing edge 11b bears radially on the limb 12b, prestressed in an intensified manner by the action of an endless spiral spring 14. The section of the sealing lip 11 bounded by the sealing edges 11a and 11b, and portions of the limbs 12a and 12b bound an annular hollow space 15, which is optionally filled with grease. The limb 12a forms a gap seal, defined by the gap 16, between the dirt deflector 12 and the covering element 6 and between the dirt deflector 12 and the seal 4. Liquid that has even penetrated into the antechamber 17 gets out away from the seal 4 again through the gap 16 as a result of gravitational or centrifugal forces.

The second carrier 5 merges at the limb 12b into the dirt deflector 12 and thus initially extends, at least partly radially between the seal 4 and the inner bearing ring 8, axially in the direction of the antifriction elements 18 and is then angled over radially outward. Here, the carrier 5 runs in the form of a disk-like section 5a axially between the antifriction elements 18 and the cage 19 on one side, and radially outward between the seal 4, the dirt deflector 12 and the covering element 6. From the section 5a, a hollow cylindrical carrying section 5b is angled over, which points axially in the direction of the covering element 6 and on which the encoder 2 is seated radially between the carrying section 5b and the section 6a. The encoder 2 engages around the radially hollow cylindrical carrying section 5b and the hollow cylindrical limb 12b.

Figure 2:
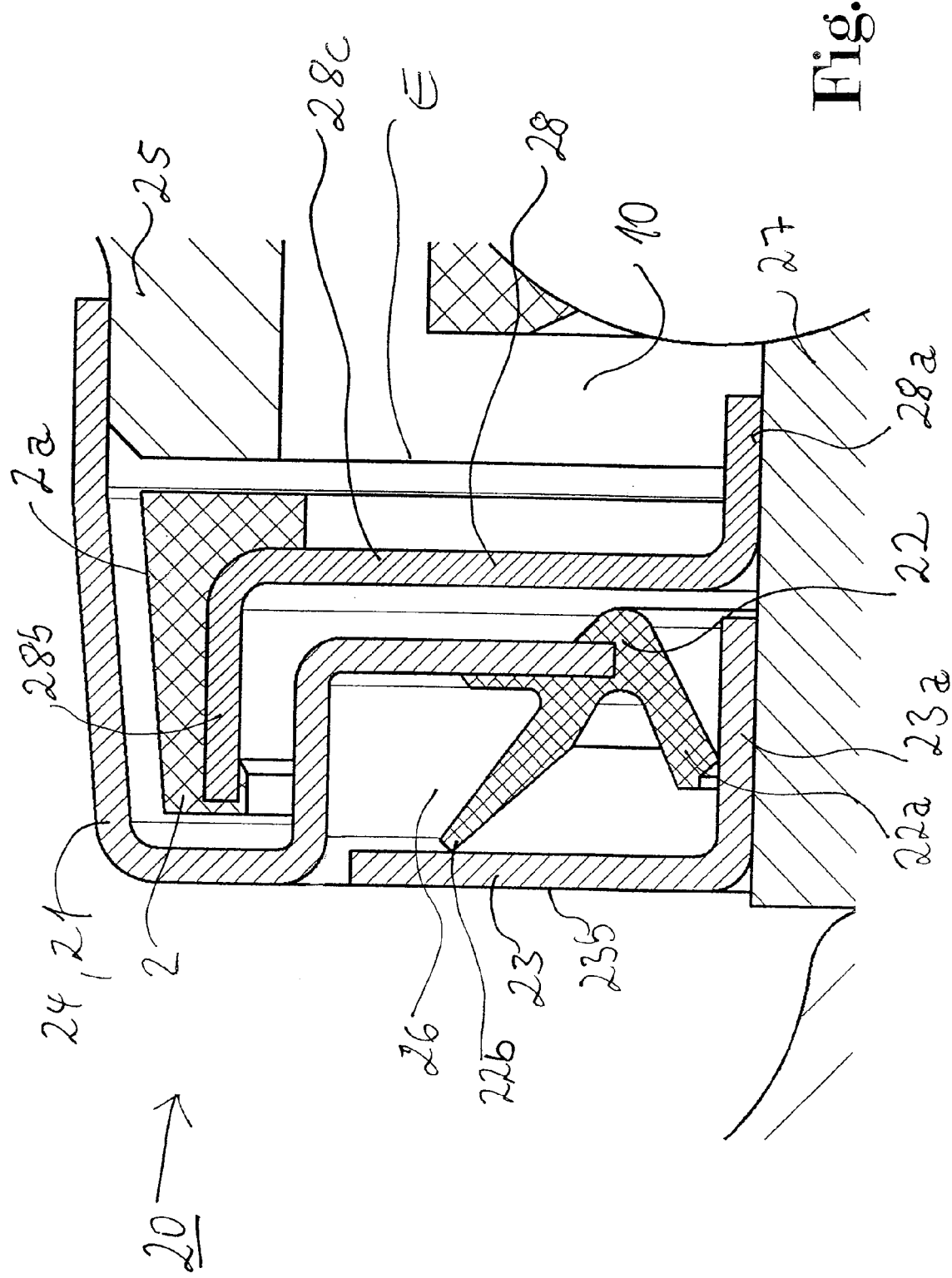

FIG. 2 shows a seal arrangement 20 comprising the encoder 2, a covering element 21 in the form of a sheet metal cover with a seal 22, and comprising a dirt deflector 23. The covering element 21 is at the same time the first carrier 24 and is seated on the rotationally fixed outer bearing ring 25. The covering element 21 covers the encoder 2 radially with respect to the outside, radially with respect to the inside and to the antechamber 26, and the encoder 2 axially. The interspace 10 bounded by the radial plane E is protected axially by the dirt deflector 23 and the seal 22 arranged after it.

The dirt deflector 23 is a separate angled sheet metal ring which is seated with one limb 23a on the inner bearing ring 27. The seal 22 bears radially with a sealing lip 22a on the limb 23a. A second sealing lip 22b is prestressed axially against a limb 23b angled away from the limb 23a at right angles.

A second carrier 28 is a Z-shaped angled ring which is seated with a hollow cylindrical section 28a on the inner bearing ring 27. A further hollow cylindrical section 28b is formed, oriented in the direction opposite to the section 28a, on a disk-like section 28c connecting the sections 28a and 28b, and carries the encoder 2 radially on the outside. The encoder 2 is formed from a resilient material with magnetizable additives and engages radially around the outside of the limb 23a.

Figure 3:
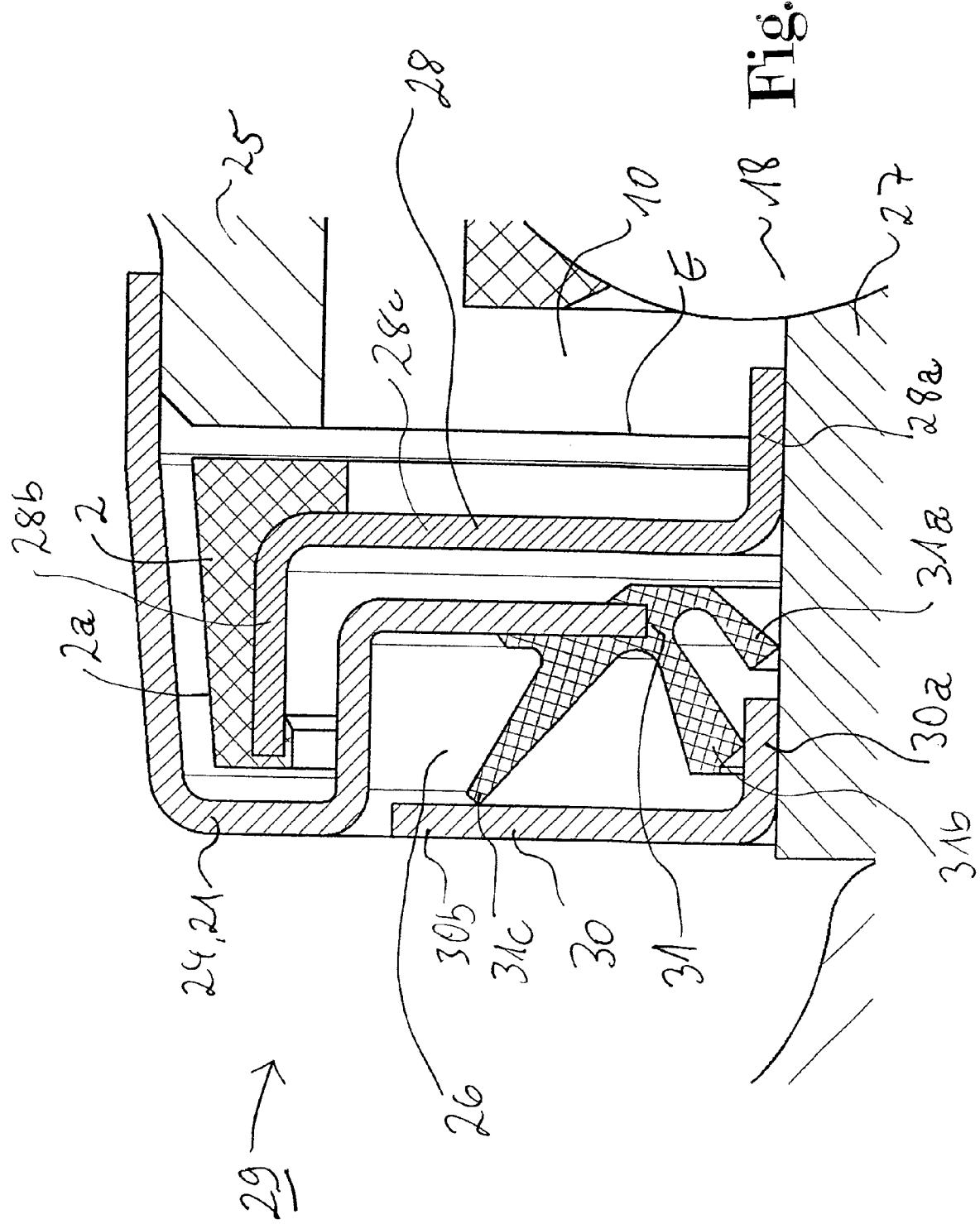

The seal arrangement 29 according to FIG. 3 has substantially the same construction as the seal arrangement according to FIG. 2 but is provided with a dirt deflector 30 whose limb 30a, which is seated on the inner bearing ring 27, is shortened as compared with the limb 23a. Axially between the limb 30a and the second carrier 28 there is a free space wherein a sealing lip 31a of a seal 31 fixed to the covering element 21 between the second carrier 28 and the limb 30a bears radially on the inner bearing ring 27. A further sealing lip 31b bears radially on the limb 30a. Finally, a third sealing lip 31c is prestressed axially against a limb 30b of the dirt deflector 30.

Figure 4:
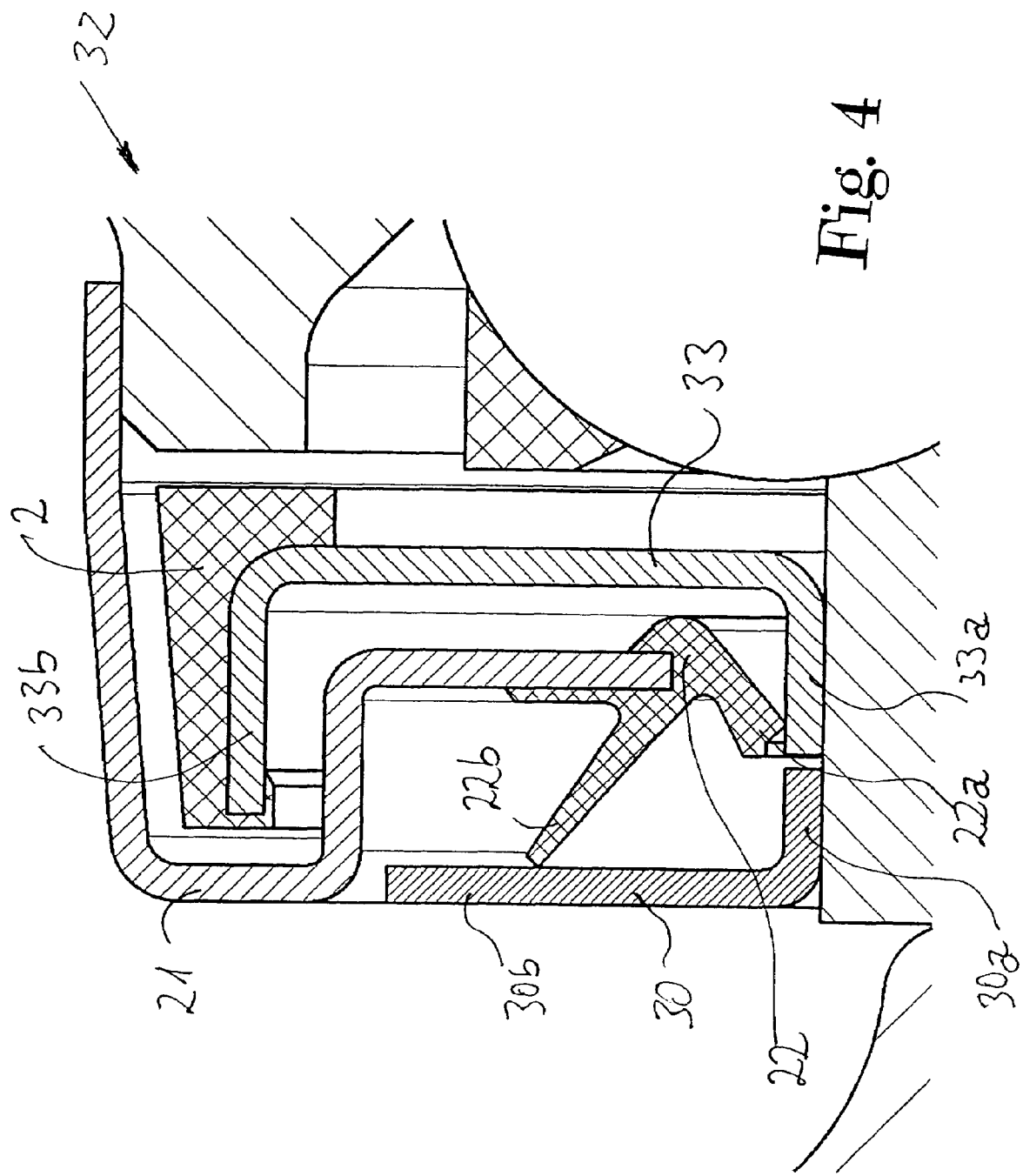

The seal arrangement 32 according to FIG. 4 shows a further alternative configuration having some features of the seal arrangements 20, 29 described previously in FIGS. 2 and 3. However, in the seal arrangement 32, a second carrier 33 has hollow cylindrical sections 33a and 33b oriented in the same direction. The section 33a in this case points axially in the direction of the dirt deflector 30. The sealing lip 22a of the seal 22 fixed to the covering element 21 bears radially on the section 33a. The sealing lip 22b is prestressed axially against the limb 30b. The section 33b of the second carrier 33 carries the encoder 2 on its outer side and reaches radially around the section 33a and the limb 30a.

FIG. 5 shows, in schematic form, a radial magnetization head 34 which, with a circularly cylindrical and radially inwardly facing polarization surface 34a, engages around an encoder 35. On the outside, the encoder 35 has a circularly cylindrical circumferential surface 35a, which is located radially opposite the polarization surface 34a. The internal diameter D is designed to be sufficiently large that, in any case, the magnetization head can still reach around even an encoder with the greatest deviation $T_1+T_2$ from a nominal diameter d. Between an encoder 35 whose diameter corresponds to the nominal diameter d and the magnetizable head 34, in the event of an unfavorable offset R, a maximum radial spacing of $T_1+T_2$ and, radially opposite, a radial spacing of 0 may be formed. For encoders which, within this tolerance range, have smaller diameters than the nominal diameter, the maximum radial spacing $>T_1+T_2$. The axis of rotation 34b of the magnetization head 34 and the axis of rotation 35b of the encoder 35 are erroneously offset by the radial offset R in relation to each other, which, in the least favorable case, corresponds to the value $T_1+T_2$.

FIG. 6 shows, in schematic form, an axial magnetization head 36 which bears axially with an annular polarization surface 36a on an annular active surface 37a of an encoder 37. The axis of rotation 36b of the magnetization head 36 and the axis of rotation 37b of the encoder 37 may be erroneously offset by the radial offset R in relation to each other.

As a consequence of the radial offset R, the finally magnetized encoder 35 or 37 may be provided with fields which are adjacent to one another in the circumferential direction and alternately polarized from north to south, but which have widths distributed over the periphery which deviate from the intended (i.e., uniform) width and pitch of the fields in relation to one another, and thus are arranged with different pitches (i.e., pitch errors) in relation to one another.

FIG. 7 shows, in schematic form, a magnetization head 38 according to an embodiment of the invention having an inner circumferential surface 38a shaped as an inner cone, which engages around a circumferential surface 39a of an encoder 39 shaped like a truncated cone and bears on the latter. The cone of the magnetization head 38 and the truncated cone of the encoder 39 have at least approximately the same cone angle α, and the height $H_1$ of the inner cone on the magnetization head 38 is greater than the height $H_2$ of the truncated cone of the encoder 39. The cone angle of the magnetization head or encoder is preferably $5°<=\alpha<=15°$. The smallest internal diameter $D_1$ of the cone of the magnetization head 38 is smaller than the smallest external diameter $d_1$ of the truncated cone of the encoder 39, so that a space T remains axially between the front faces 38c and 39c. The rectilinear inner circumferential lines 40 of the inner circumferential surface 38a are longer than the outer circumferential lines 41 of the circumferential surface 39a of the encoder 39, so that the inner cone projects beyond the truncated cone on both sides. The axes of rotation 38b and 39b of the magnetization head 38 and of the encoder 39 are located coinciding with each other with no offset. After the magnetization has been completed, the encoder 39 therefore has polarized fields which are identical to one another and are arranged with no pitch error in relation to one another.

Although the present invention has been described in relation to particular embodiments thereof, many other variations and modifications and other uses will become apparent to those skilled in the art. Therefore, the present invention is not limited by the specific disclosure herein.

What is claimed is:

1. A seal arrangement which seals off at least one radial interspace between a rotatable bearing ring and a rotationally fixed bearing ring, the seal arrangement comprising:
    a first carrier, the first carrier carrying a resilient seal and being fixed to said rotationally fixed bearing ring;
    a second carrier, the second carrier being fixed to the rotatable bearing ring and carrying an encoder, the encoder having an outwardly oriented circumferential surface which defines a truncated circular cone; and
    a dirt deflector, the dirt deflector and the first carrier being arranged such that they can rotate relative to each other such that the seal bears at least on the dirt deflector, the encoder being arranged outside the interspace and around the rotatable bearing ring.

2. The seal arrangement as claimed in claim 1, further comprising a covering element, the encoder being covered radially and axially by the covering element, the covering element being fixed to one of the bearing rings.

3. The seal arrangement as claimed in claim 2, in which the covering element at least partly covers the seal.

4. The seal arrangement as claimed in claim 2, in which the covering element is formed in one piece with the first carrier.

5. The seal arrangement as claimed in claim 2, in which the covering element is fixed to a radially outer surface section of the rotationally fixed bearing ring.

6. The seal arrangement as claimed in either one of claims 4 and 5, in which the covering element, starting from the rotationally fixed bearing ring, initially extends axially away from the rotationally fixed bearing ring, for being radially disposed between a sensor and the encoder, and covers the encoder in the radial direction; the covering element then extends radially and at least partly covers the encoder and the interspace in the axial direction; and the covering element finally extends axially in the direction toward the interspace while carrying the seal.

7. The seal arrangement as claimed in either one of claims 4 and 5, in which the covering element, starting from the rotationally fixed bearing ring, initially extends axially away from the rotationally fixed bearing ring, for being radially disposed between a sensor and the encoder, and covers the encoder in the radial direction; the covering element then extends radially and at least partly covers the encoder and the interspace in the axial direction; the covering element then runs in the direction toward the interspace radially between the encoder and the rotatable bearing ring; and the covering element finally extends radially in the direction toward the rotatable the bearing ring while carrying the seal.

8. The seal arrangement as claimed in claim 2, wherein said first and second carriers, said dirt deflector and said covering element are interconnected to form a cartridge.

9. The seal arrangement as claimed in claim 1, in which the seal bears on the dirt deflector in the axial direction with at least one sealing lip.

10. The seal arrangement as claimed in claim 1, in which the seal bears radially on the dirt deflector with at least one sealing lip.

11. The seal arrangement as claimed in claim 1, in which the seal bears directly on the rotatable bearing ring with at least one sealing lip.

12. The seal arrangement as claimed in claim 1, in which the seal bears radially on the second carrier with at least one sealing lip.

13. The seal arrangement as claimed in claim 1, in which the seal and the dirt deflector enclose between them an annular hollow space filled with a lubricating grease.

14. The seal arrangement as claimed in claim 1, in which the dirt deflector is a ring with an angled cross section having two limbs disposed at right angles to each other, the encoder engaging radially around at least one of the limbs.

15. The seal arrangement as claimed in claim 1, in which the second carrier is a ring with two hollow cylindrical sections that face away from each other, the sections being connected to each other by a web which is disk-like and extends radially away from the rotatable bearing ring; wherein one of the sections accommodates the encoder radially and the other of the sections is seated on the rotatable bearing ring.

16. The seal arrangement as claimed in claim 1, in which the encoder is formed from a resilient material.

17. In combination, a seal arrangement which seals off at least one radial interspace between a rotatable bearing ring and a rotationally fixed bearing ring, the seal arrangement comprising:
  a first carrier, the first carrier carrying a resilient seal and being fixed to said rotationally fixed bearing ring;
  a second carrier, the second carrier being fixed to the rotatable bearing ring and carrying an encoder, the encoder having an outwardly oriented circumferential surface which defines a truncated circular cone; and
  a dirt deflector, the dirt deflector and the first carrier being arranged such that they can rotate relative to each other such that the seal bears at least on the dirt deflector, the encoder being arranged outside the interspace and around the rotatable bearing ring; and
  a magnetization head for polarizing said encoder, in which the magnetization head has on its inner circumference an inner circumferential surface defining an inner cone, the inner circumferential surface corresponding with the circumferential surface of the truncated cone of the encoder; the rectilinear inner circumferential lines of the inner circumferential surface describing the inner cone being inclined with respect to the axis of rotation of the magnetization head, and being longer than the circumferential lines oriented in the same direction as the inner circumferential lines and describing the circumferential surface of the encoder.

18. The combination as claimed in claim 17, in which the smallest inner cone diameter of the inner cone is smaller than the smallest external diameter of the truncated circular cone, and in which the inner circumferential surface of the magnetization head, which is seated on the encoder during polarization and bears on the circumferential surface, projects axially beyond the circumferential surface of the encoder on both sides.

* * * * *